(12) United States Patent
Wadensten

(10) Patent No.: US 7,900,884 B1
(45) Date of Patent: Mar. 8, 2011

(54) ACTIONABLE VIBRATOR BRACKET FOR COUPLING A VIBRATOR TO A RAILROAD CAR

(76) Inventor: Theodore S. Wadensten, Charlestown, RI (US)

( * ) Notice: Subject to any disclaimer, the term of this patent is extended or adjusted under 35 U.S.C. 154(b) by 0 days.

(21) Appl. No.: 12/592,414

(22) Filed: Nov. 24, 2009

(51) Int. Cl.
*A47B 96/00* (2006.01)

(52) U.S. Cl. .......... 248/222.13; 248/222.14; 248/223.41; 248/560; 414/375

(58) Field of Classification Search ............. 248/222.13, 248/223.41, 222.14, 225.11, 229.11, 560, 248/562, 563, 674; 267/140.11, 140.13, 267/141, 14, 140.4; 414/375, 809; 198/770, 198/771, 763, 752.1, 758
See application file for complete search history.

(56) References Cited

U.S. PATENT DOCUMENTS

| | | | | |
|---|---|---|---|---|
| 3,003,733 A | * | 10/1961 | Peterson | 248/223.41 |
| 3,463,431 A | * | 8/1969 | Matson | 248/222.14 |
| 3,638,914 A | * | 2/1972 | Wadensten | 366/125 |
| 5,636,826 A | * | 6/1997 | Nakagaki et al. | 248/562 |
| 5,833,205 A | * | 11/1998 | Lindbeck | 248/671 |
| 6,058,588 A | * | 5/2000 | Wadensten | 29/426.5 |
| 6,349,817 B1 | * | 2/2002 | Wadensten | 198/770 |
| 7,195,217 B1 | * | 3/2007 | Wadensten | 248/223.41 |
| 7,458,547 B1 | * | 12/2008 | Wadensten | 248/222.14 |

* cited by examiner

*Primary Examiner* — Terrell Mckinnon
*Assistant Examiner* — Todd M. Epps

(57) ABSTRACT

A vibrator bracket for coupling a vibrator to a female receptacle attached to a railroad car. The vibrator is mounted to the vibrator mounting member. The vibrator mounting member includes a tongue and at least one keeper member. The tongue is wedge shaped and has an insertion end, a first side, and a second side. A flange member supports the vibrator bracket and allows it to project just beyond a bottom end of the female bracket. An urging member is mounted to an upper portion and its selective movement towards the railroad car provides for abutment of the first side of the tongue with a rear wall of the female receptacle while at least one keeper member simultaneously abuts the bottom end of the female bracket for retaining the vibrator mounting member therein while the railroad car is emptying.

16 Claims, 7 Drawing Sheets

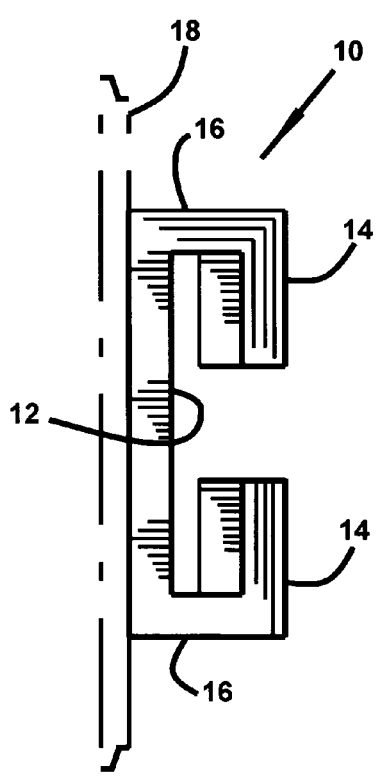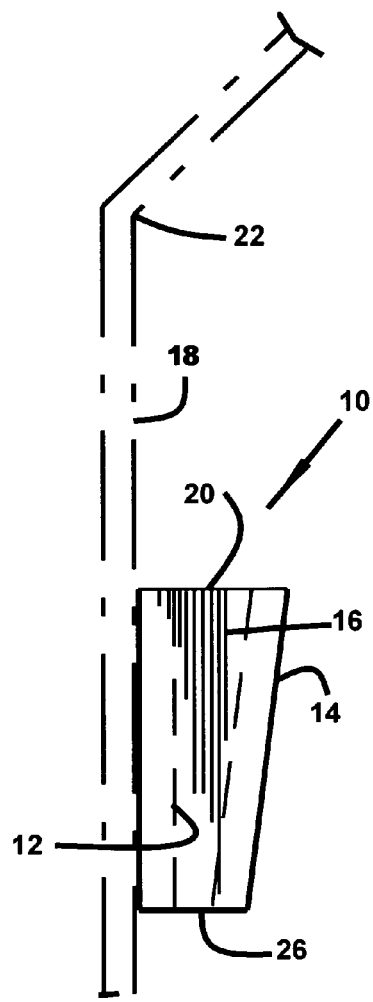
Fig. 1
Fig. 2

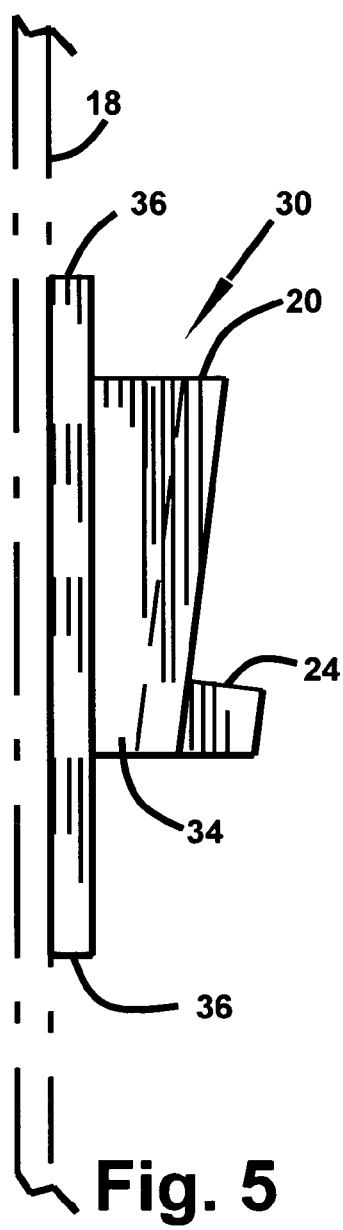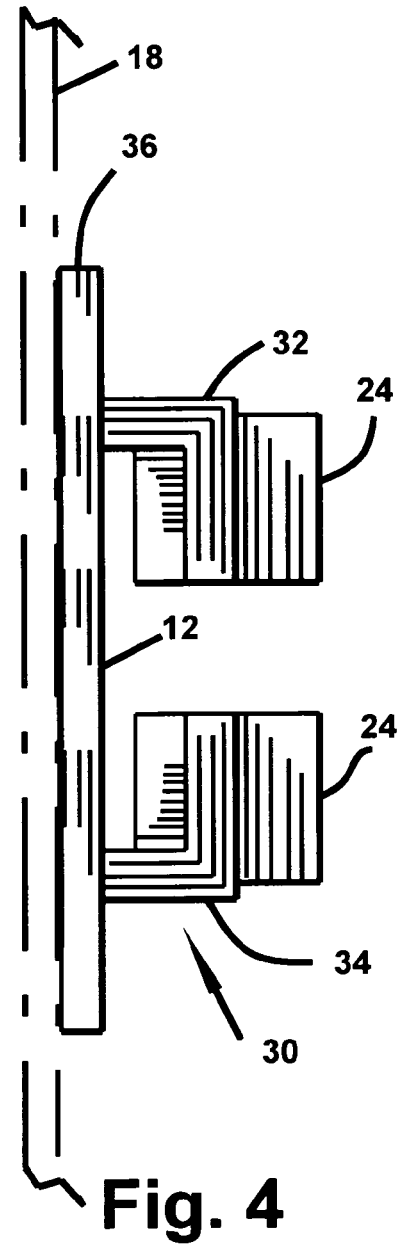

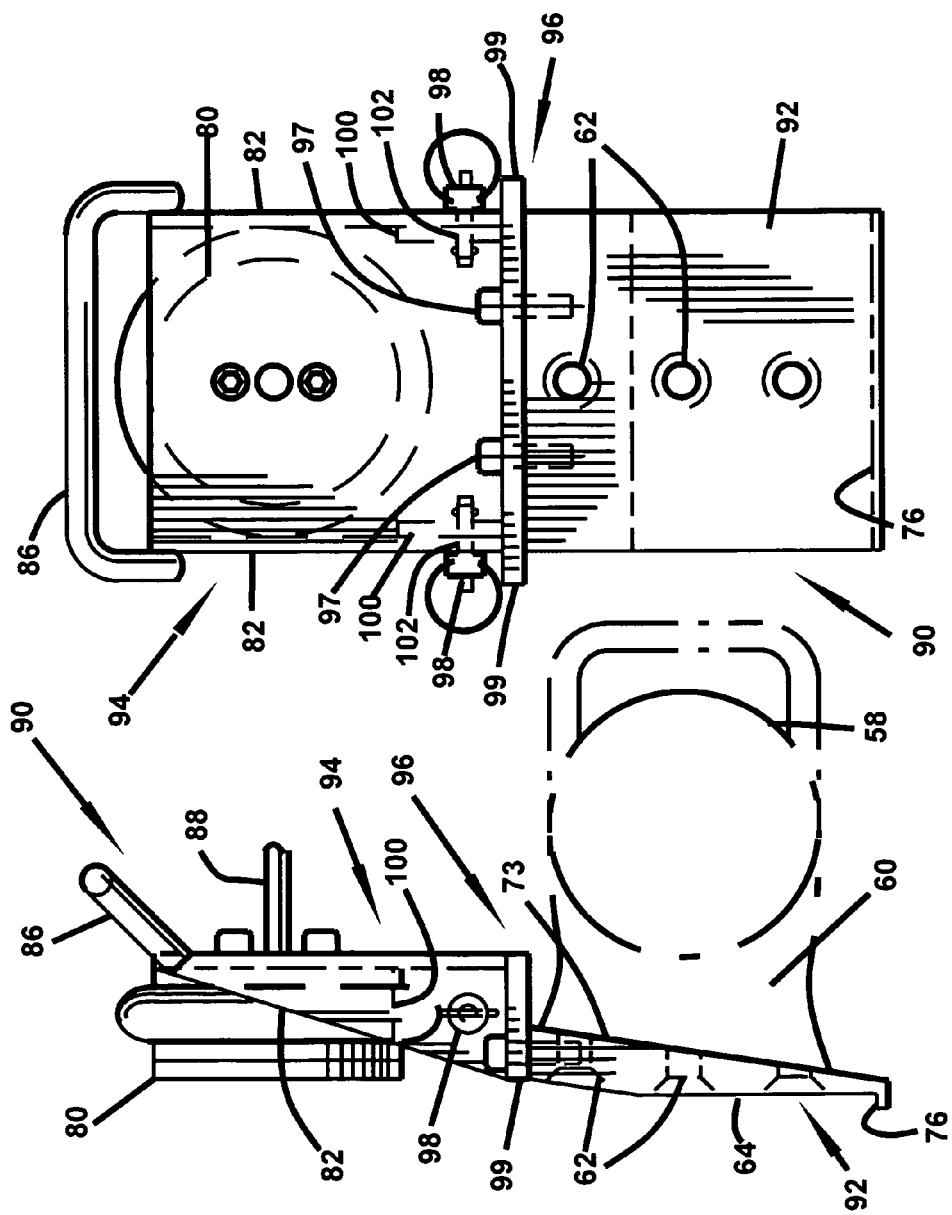

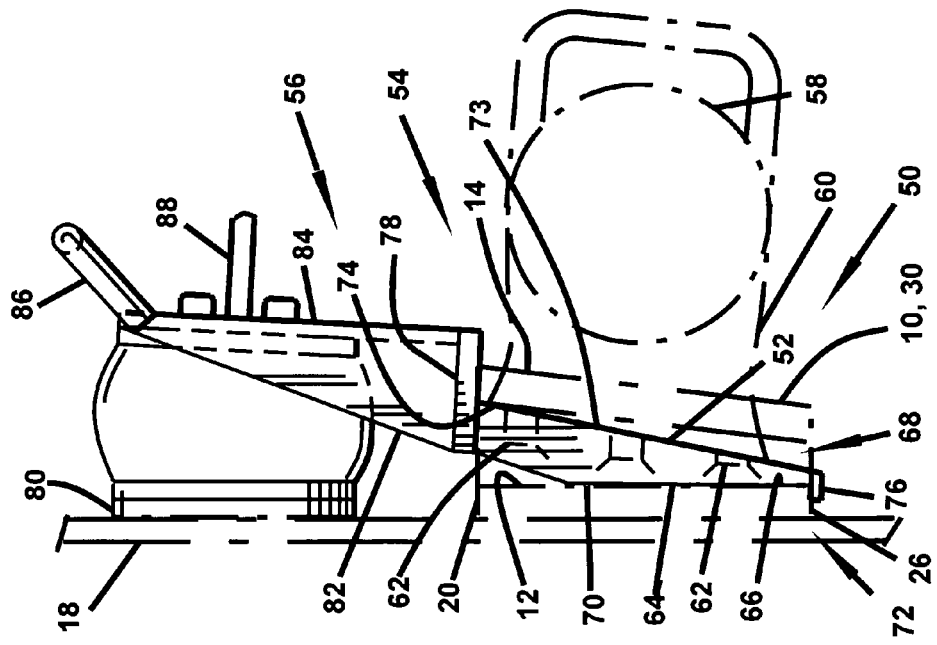
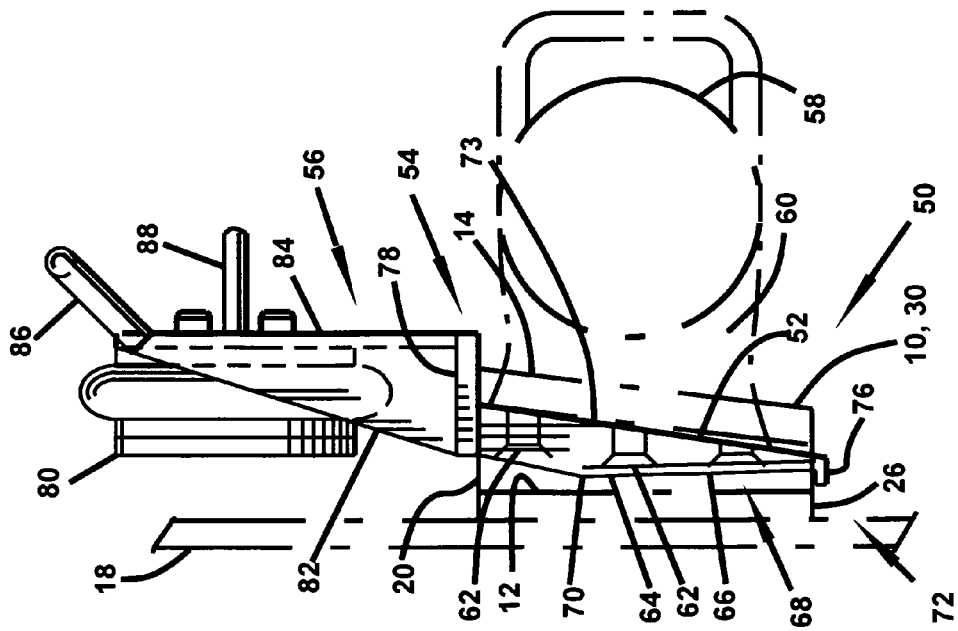
Fig. 11
Fig. 10

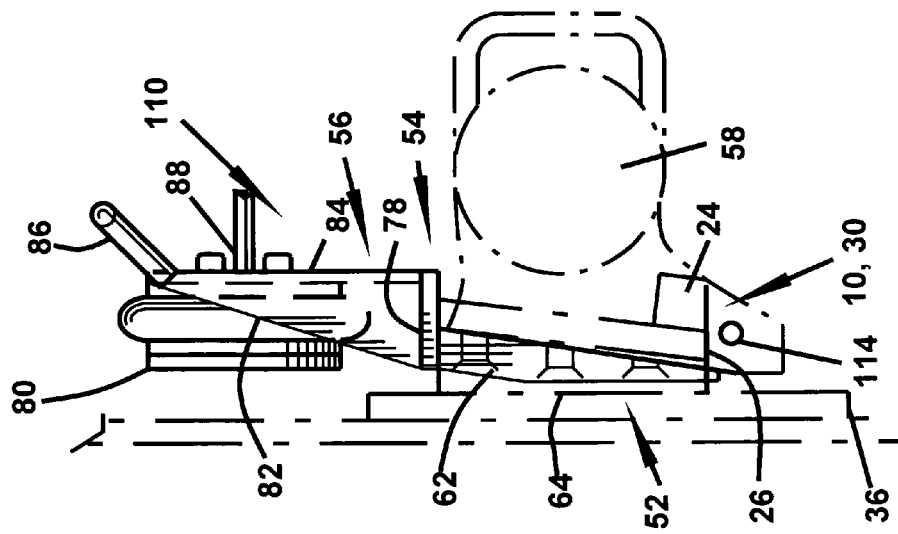
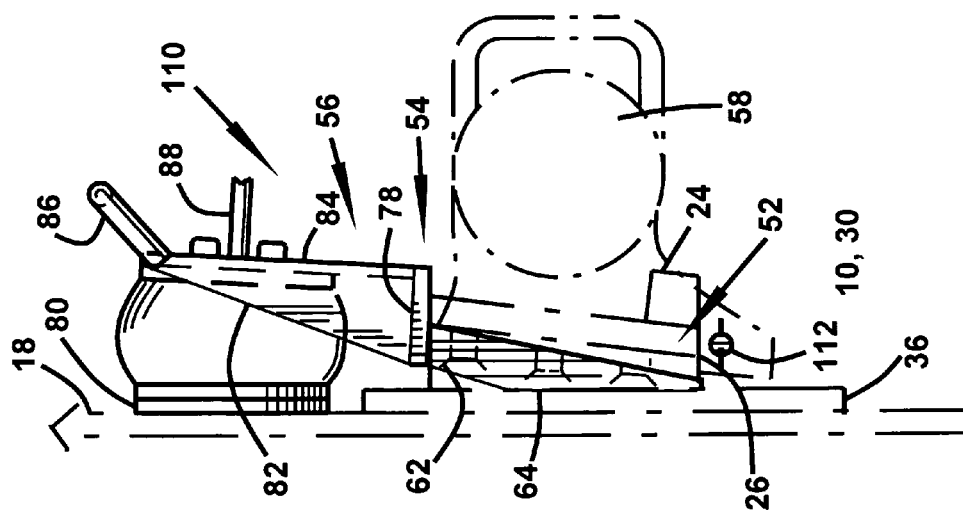

ACTIONABLE VIBRATOR BRACKET FOR COUPLING A VIBRATOR TO A RAILROAD CAR

CROSS REFERENCE TO RELATED APPLICATION

STATEMENT REGARDING FEDERALLY SPONSORED RESEARCH OR DEVELOPMENT

Not Applicable

BACKGROUND OF THE INVENTION

1. Field of the Invention

With regard to the classification of art, this invention is believed to be found in the general class for Supports and more particularly to those subclasses pertaining to the removable mounting of a car shaker vibrator to a railroad car.

2. Description of Related Art

Railroad hopper cars are used to transport various types of material such as; coal, cement, chemicals, flour, grains and the like. Usually, transporting the material from one site to another results in compaction thereof. After compaction, the materials generally are jammed and do not flow easily upon the opening of the hopper car discharge gate or gates. Generally a car-shaker vibrator is removably attached to the railroad hopper car for breaking loose the jammed material and maintaining its flow until the car is nearly emptied. Removable or detachable vibratory railroad car shaker apparatus are known in the field. Exemplary brackets and tools for the removable mounting of a vibrator to a railroad car are disclosed in U.S. Pat. No. 3,003,733 that issued to Petersen on Oct. 10, 1961; U.S. Pat. No. 3,463,431 that issued to Matson on Aug. 26, 1969; and U.S. Pat. No. 6,058,588 that issued to the present inventor on May 9, 2000. U.S. Pat. No. 7,195,217 that issued to the present inventor on Mar. 27, 2007 is solely owned by him and discloses a bracket that uses the forces generated by a vibrator for seating and loosening bracket from the railroad car. U.S. Pat. No. 7,458,547 that issued to the present inventor on Dec. 2, 2008 is solely owned by him and discloses an expandable bracket for mounting a vibrator to a railroad car. These patents disclose a common type of separable male/female bracket arrangement. Usually the female portion of the bracket is attached to a hopper portion of a railroad car. This type of bracket is sometimes referred to as a Gardner or Tyler type and generally has a C-shaped seat or pocket portion (i.e. a wedge, dovetail or the like.) The male portion generally may be characterized as a T-shape that has a blade member (i.e. male wedge, male dovetail or the like) and a reduced connector portion (i.e. web, neck, leg and the like). U.S. Pat. No. 3,003,733 also discloses a wedge shaped tool for separating the male portion from the female portion of the bracket. U.S. Pat. No. 3,463,431 discloses a threaded means for retaining the male portion of the bracket in the female portion of the bracket. U.S. Pat. No. 6,058,588 that issued to the present inventor and is solely owned by him discloses a tool that may be employed for releasing the wedge from the female portion or half.

All of the above listed patents are attempts to improve the installation and removal of railroad car shakers at their point of use. However, the listed patents may not be practical in application to all the railroad cars that are used for the conveyance of materials due to either the wear of the female portion of the bracket or the mounting location of the female bracket or the type of female bracket (Garner, Tyler, or Newer Low Cost style). The end user therefore must be prepared to mount his car shaker on various railroad cars with various brackets and mounting conditions. This situation requires multiple types of male brackets be in stock at the discharge site.

It has been determined that there is a need for a male bracket that may couple a car shaker vibrator to most of the current railroad cars and be easily removable there from.

The present invention is believed to solve the identified need by providing the end user with at least one type of male bracket for coupling a car shaker vibrator to a majority of the railroad cars in operation today.

SUMMARY OF THE INVENTION

The present invention may be briefly described as: actionable vibrator bracket for coupling a vibrator to a female receptacle attached to a railroad car that is to be vibrated. The female receptacle having an entry end and a second end that is distal to the entry end. The actionable vibrator bracket includes: a vibrator mounting member, a middle portion and an upper portion. The vibrator mounting member is adapted for mounting the vibrator thereto. The vibrator mounting member includes at least one keeper member. The vibrator mounting member further includes a tongue portion that is wedge shaped and has an insertion end, a first side, and a second side. The insertion end of the tongue portion projects a predetermined distance from the middle portion. The middle portion further includes at least one flange member that is arrayed for resting on the entry end of the female receptacle that is attached to the railroad car while allowing the insertion end of the tongue portion to project a predetermined distance beyond the bottom or second end of the female bracket. The upper portion extends a selected distance from the middle portion in a direction that is distal to the tongue portion and is sized and configured for mounting an urging member thereon and thereto. The urging member is adapted for selective movement to and towards a wall of the railroad car.

Wherein the tongue portion of the vibrator mounting member is sized to be loosely seated interior of the female receptacle while being simultaneously supported on the entry end of the female receptacle by the at least one flange member of the middle portion. Subsequent selective movement of the urging member to and towards the railroad car provides for the contact of the first side of the tongue portion with an interior surface or rear wall of the wedge pocket of the female receptacle while simultaneously providing for the abutment of at least one keeper member with the bottom or second end of the female bracket for retaining the vibrator mounting member during the selective emptying of the railroad car. Subsequent selective movement of the urging member away from the railroad car allows for the removal of the abutment of the at least one keeper member from the bottom or second end of the female bracket for the loosening and subsequent easy removal of the vibrator mounting member from the female receptacle.

The present invention is believed to be adaptable to various types of vibrators (i.e., rotary, linear, etc) that may be operated either pneumatically, or electrically or hydraulically.

The urging member may be a removable portion of moveable end of an actuator such as a pneumatically operated spring, pneumatically operated pancake cylinder and the like. The use of a pneumatically controlled actuator is preferred for ease of use and operation when a pneumatic rotary vibrator is used.

In addition to the above summary, the following disclosure is intended to be detailed to insure adequacy and aid in the understanding of the invention. However, this disclosure, showing particular embodiments of the invention, is not intended to describe each new inventive concept that may arise. These specific embodiments have been chosen to show at least one preferred or best mode for an actionable vibrator bracket of the present invention. These specific embodiments, as shown in the accompanying drawings, may also include diagrammatic symbols for the purpose of illustration and understanding.

BRIEF DESCRIPTION OF THE DRAWING

FIG. 1 represents a plan view of a C-type female bracket that is mounted on a sidewall of a railroad car. The sidewall is shown in dashed outline.

FIG. 2 represents a left side elevation of the C-type female bracket of FIG. 1 that is mounted to sidewall of the railroad car. The sidewall has a transition bend formed in it that limits the access space immediately above female bracket

FIG. 4 represents a plan view of a relatively new low cost type of female bracket that is adapted for mounting to a sidewall of a railroad car.

FIG. 5 represents a left side elevation of the female bracket of FIG. 4 that is mounted to the sidewall of a railroad car.

FIG. 8 represents a front elevation of a second embodiment of a male bracket of the present invention. This male bracket is similar to the male bracket of FIG. 6 except that it is assembled from two selectively separable sub-assemblies.

FIG. 9 represents a left side elevation of the second embodiment of the male bracket of FIG. 8.

FIG. 10 represents a left side elevation of the first embodiment of the male bracket that has been loosely seated in the female bracket of FIGS. 1 and 2. The sidewall and female bracket are shown in dashed outline.

FIG. 11 represents a left side elevation of the male bracket shown in FIG. 10 after its urging member contacts the sidewall of the railroad car.

FIG. 12 represents a left side elevation of a third embodiment of the male bracket of the present invention that may be loosely mounted in either of the female brackets of FIG. 1, or FIG. 3 or FIG. 5. This view also showing a removable type of a keeper member in the form of an elongated pin that is tethered to the male bracket. The sidewall and female bracket are shown in dashed outline.

FIG. 13 represents a side elevation of the male bracket of FIG. 12 after the urging member contacts the sidewall of the railroad car subsequent to the removable keeper member being placed in a through aperture for engaging or abutting an edge at the bottom end of the female bracket.

Figure 3:
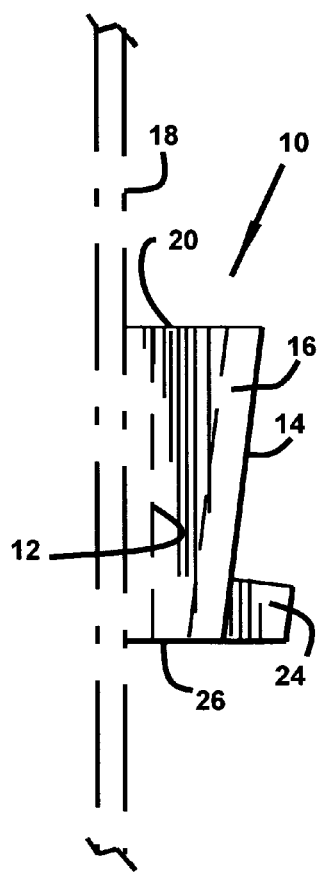
FIG. 3 represents a left side elevation of the C-type female bracket of FIG. 1 that is mounted to the sidewall of a railroad car and has unrestricted access immediately above the female bracket. This female bracket further includes a pair of lugs that project from the bottom of its front face.

In the following description and in the appended claims, various details are identified by specific names for convenience. These names are intended to be generic in their application while differentiating between the various details. The corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Description of Female Bracket Types

Referring first to FIGS. 1 through 5. The C-type female bracket shown in FIG. 1 and FIG. 2 is generally identified as 10. This female bracket 10 has a generally C shaped cross section as more clearly seen in FIG. 1. Female bracket 10 has a rear wall 12, a pair of inclined front panels 14 and a pair of end walls 16 that are arrayed in a spaced relationship and connect the front panels 14 with the rear wall 12. An exterior surface of the rear wall 12 is generally attached to a sidewall 18 of a railroad car as may be seen in FIGS. 1 and 2. Female bracket 10 may be mounted on the sidewall 18 of the railroad car in various locations. In some instances the female bracket 10 may be mounted to a discharge chute portion of the railroad car in such a position that its entry end 20 is close to a transition bend 22 in the sidewall 18 therefore restricting the length of space above the entry end for insertion of a male bracket therein.

Referring now to FIG. 3, some types of the C-type female brackets include the features of female bracket 10 but further include a pair of spaced lugs 24 that are positioned at or near the second end or bottom end 26 and protrude outwardly there from. The bottom end 26 of the female bracket 10 is distal to the entry end 20.

Referring now to FIGS. 4 and 5, a new type of female bracket is generally identified as 30. Female bracket 30 consists of right hand tapered guide 32 and a left hand tapered guide 34 that are attached to a rear plate member 36. The rear plate member 36 is generally larger than the tapered guides 32 and 34. This results in a rear plate member 36 that extends beyond the guides 32 and 34 in all direction by a minimum of a 2" (5.1 cm). The rear plate member 36 is attached to sidewall 18 of the railroad car by a suitable means and forms the rear wall 12 of the female bracket 30.

Description of the First Embodiment

Figures 6, 7:
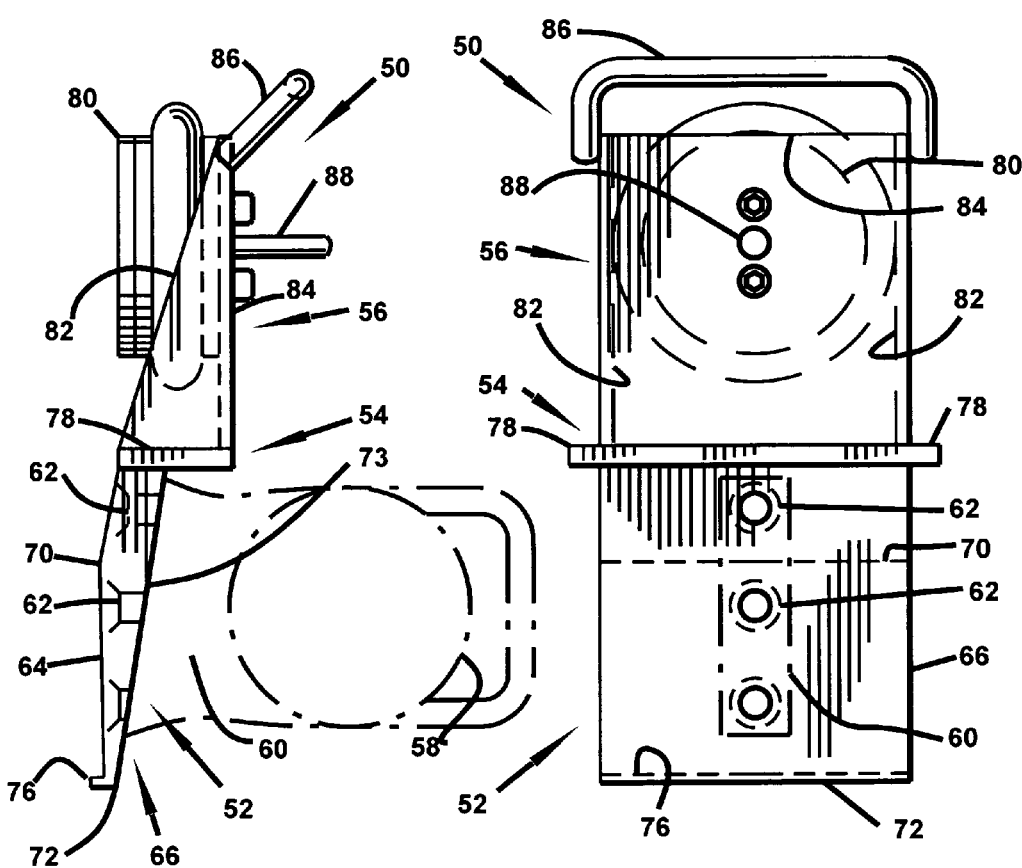
FIG. 6 represents a front elevation of a first embodiment of a male bracket of the present invention.
FIG. 7 represents a left side elevation of the first embodiment of the male bracket of FIG. 6. This male bracket including a first type of a keeper member

Referring first to FIG. 6 and FIG. 7. The first embodiment of the actionable vibrator bracket is generally identified as 50. The vibrator bracket 50 includes a vibrator mounting member 52, a middle portion 54 and an upper portion 56. A vibrator that is shown in dashed outline is identified as 58. The vibrator 58 may be either pneumatically, or electrically or hydraulically operated. The vibrator 58 may be of the rotary or linear type. The vibrator 58 is removably secured to the vibrator mounting member 52 by a plurality of threaded bolts (not shown) that are threaded into a neck or web portion 60. This neck or web portion 60 may be integrally formed as part of a vibrator housing or provided as a separate member that is inserted as a spacer or an adapter between the mounting feet of the vibrator housing and the vibrator mounting member 52. The neck or web portion 60 passes through the gap between the front panels 14. The heads of the threaded bolts should be of the type and size that allows them to be seated in recessed apertures 62 that are selectively spaced and formed into a first side 64 of a tongue portion 66 of the vibrator mounting member 52 for providing a flush condition. One non-limiting example of the type of recessed apertures 62 are counter sunk apertures for use with a flat head bolt.

Referring now to FIGS. 6, 7, 10 and 11. The tongue portion 66 is wedge shaped and sized and shaped to fit loosely into a cavity 68 formed by the interior walls of the female bracket 10 or 30 with a selected peripheral clearance. It is preferred that the thicker portion 70 of the tongue portion 66 have a peripheral clearance with respect to the entry end 20 of the cavity 68 between 0.125 in. and 0.250 in. (3 mm to 6 mm) for allowing its easy insertion and removal thereof. The tongue portion 66 further includes an insertion end 72, and a second side 73. It is preferred that the thickness of the tongue portion 66 between the first side 64 and the second side 73 be less at the insertion end 72 than at the thicker portion 70. The tongue portion 66 should be of a sufficient length for allowing the insertion end 72 to protrude beyond the face at the bottom 26 of the female bracket 10 or 30 while and when the middle portion 54 is resting on the entry end 20 of the female bracket as may be seen in FIG. 10 and FIG. 11. Referring again to FIG. 6 and FIG. 7, it is preferred that this first embodiment further include at least one keeper member 76 that is a lug that projects at right angles for a predetermined distance from the first side 64 of the insertion end 72. The use of this keeper member 76 will be discussed below.

Referring to FIGS. 2, 3, 6, 7, 10, and, 11 the middle portion 54 includes at least one flange 78 that is adapted to rest on the entry end 20 of the female bracket 10 or 30. It is preferred that this flange 78 extends in at least two directions over the end walls 16 of the female bracket to insure contact with the entry end of the female bracket 10 or 30.

The upper portion 56 of the vibrator bracket 50 is sized for mounting an urging member 80 thereto. The urging member 80 depicted in this first embodiment is a pneumatically operated spring or pancake cylinder. The urging member 80 should have a sufficient force capacity and stroke length for contacting the sidewall 18 of the railroad car when selectively actuated after the vibrator bracket 50 has been loosely seated in the female bracket 10. The urging member 80 must have a sufficient force capacity for maintaining contact of the first side 64 with the wall 12 during operation of the vibrator 58. It is to be noted that the upper portion 56 should be of sufficient strength for minimizing deflection thereof when the urging member 80 is energized. It is preferred that gussets 82 also be provided to reinforce a vertical mounting plate 84 that the urging member 80 is removably attached thereto.

It is preferred that the upper portion further includes a handle 86 for aiding in the insertion and removal of the vibrator bracket 50 from the female bracket attached to the railroad car.

Description of the Second Embodiment

Referring now to FIG. 8 and FIG. 9. The second embodiment of the vibrator bracket of the present invention is generally identified as 90. The second embodiment of the vibrator bracket 90 is very similar to the first embodiment 50 of the vibrator bracket. In this second embodiment 90, the vibrator mounting member 92 and the upper portion 94 with its urging member 80 attached are discrete individual members or individual portions or sub-assemblies that are removably joined and retained at the middle portion 96 by and with at least one retaining member 98. In this second embodiment 90, the middle portion 96 includes an elongated flange plate 99 that has a pair of ears 100 that extend upwardly and are attached thereto in spaced relationship that allows for mating with the spaced gusset members 82 of the U-shaped upper portion 94. It is preferred that the middle portion 96 be removably secured to the vibrator mounting member 92 with a pair of threaded bolts 97 so that the vibrator mounting member 92 can be change after being damage or worn. It is preferred that two short retaining members 98 be used rather than one elongated retaining member that would need to be inserted into and aligned through all the apertures 102 in each ear 100 and gusset 82. The retaining members 98 are selectively removable for allowing the vibrator and the vibrator mounting member 92 with its attached flange plate 99 to be installed first and seated in confined locations such as a female bracket shown in FIG. 2. Next, the U-shaped upper portion 94 is positioned on the elongated flange plate 99 with the through apertures 102 aligned. Each retaining member 98 is then inserted and seated in its respective through aperture 102 for securing the U-shaped upper portion 94 to the vibrator mounting member 92. It is preferred that each retaining member 98 be tethered to either the vibrator mounting member 92 or the upper portion 94 for convenience in use. One non-limiting example of a retaining member 98 is a commercially available ball detent pin.

Description of the Third Embodiment

Figure 14:
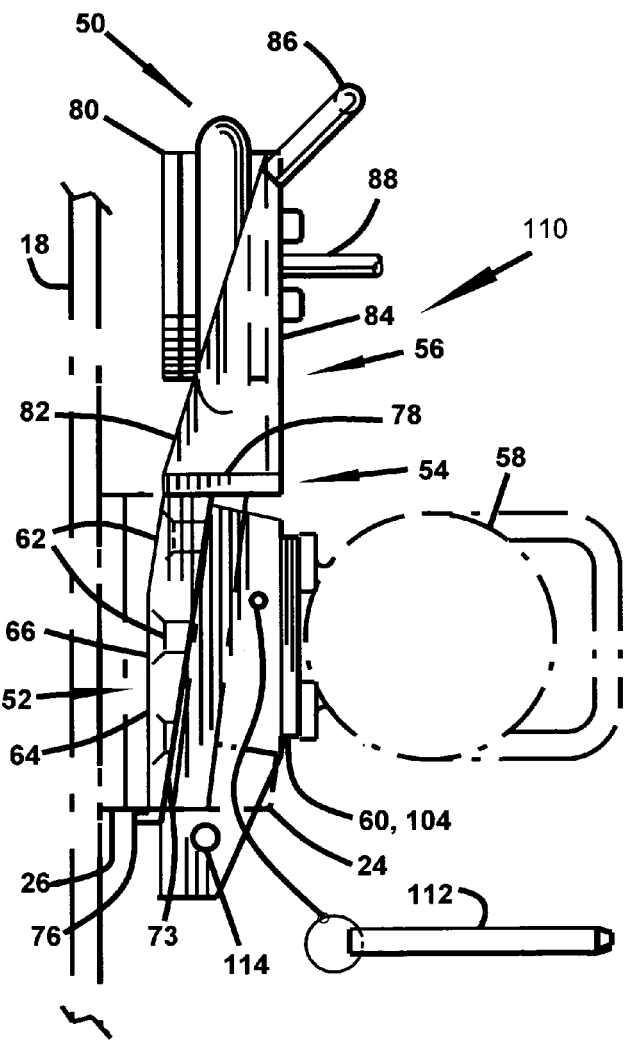
FIG. 14 represents a left side elevation of the male bracket of FIG. 7 that further includes a neck portion in the form of an adapter block for mounting the vibrator thereto. The adapter block includes an aperture for receiving the tethered removable keeper member of FIG. 12.

Referring now to FIGS. 12 through 14. A third embodiment of the vibrator bracket of the present invention is generally identified as 110. Vibrator bracket 110 is similar in most respects to vibrator bracket 50 and intended for use with all of the female brackets shown in FIGS. 1 through 5. In this third embodiment the keeper member 112 is an elongated pin that is attached to a selected point on the vibrator bracket 110 by and with a flexible tether. After the vibrator and the vibrator bracket 110 are loosely seated in the female bracket, the keeper member 112 is positioned in a through aperture 114 in the neck or web portion 60 of the vibrator. As previously mentioned this neck or web portion 60 may be integrally formed into a vibrator housing or provided as a separate member that is inserted as a spacer between the mounting surface of the vibrator housing and the tongue. When the vibrator bracket 110 is used primarily with the new or low cost female bracket 30 the keeper member 76 may be removed or eliminated from the tongue portion 66 for allowing a fuller contact of the first side 64 with the wall of the railroad car when the flange portion of the rear plate member 36 projects below the bottom most edge 26 of the tapered guides 32 and 34. However it is to be noted that vibrator bracket 110 may include both of the keeper members 76 and 112.

Use and Operation

Referring to FIGS. 10 and 11, (1) an operator uses the handle 86 to loosely seat the male tongue portion 66 of the vibrator bracket into the cavity 68 of the female bracket 10 or 30 so that the flange 78 rests on the entry end 20 of the female bracket 10 or 30. (2) When the bottom edge of the rear wall 12, the front panels 14 and the end walls are in close alignment and are slightly above the upper face of the keeper member 76 of the seated vibrator bracket, the operator connects a supply line 88 to a supply port for the body portion of the urging member 80 to a source of a fluid under pressure. It is preferred that a standard control valve, not shown, be located in the supply line 88 for controlling the direction of flow of the pressurized fluid to the body portion of the urging member 80. The urging member 80 is moved towards the sidewall 18 of the railroad car when the pressurized fluid is applied to the body portion of the urging member 80. (3) After the urging member 80 contacts the sidewall 18 of the railroad car, the continued application of the pressurized fluid to the body of the urging member 80 moves the vibrator bracket 50 in a clockwise direction until the second side 73 contacts the interior face 74 of the front panels 14 of the female bracket 10. Further application of the pressurized fluid in the body portion of the urging member 80 moves the lug type keeper member 76 into engagement with the bottom 26 of the rear wall 12 of the female bracket while simultaneously allowing the first side 64 of the vibrator bracket to contact the interior surface of the rear wall 12 of the female bracket. (4) The vibrator 58 may then be energized by whatever motive force for the type of vibrator installed on the vibrator bracket. Generally, the vibrator is pneumatically operated so therefore the body portion of the urging member 80 is either an air spring or a bellows or a pancake cylinder. The vibrator bracket is retained in the female bracket and the contact of the first side with the rear wall 12 is maintained by fluid pressure that maybe maintained by either a closed control valve or the continuous connection of the supply line 88 to a source of a pressurized fluid. (5) After the vibrator 58 is de-energized and the railroad car has been sufficiently emptied, the pressure to the body of the urging member 80 is vented by way of the control valve. After the pressure has been released, the operator pushes the handle 86 towards the wall 18 of the railroad car to release the keeper member 76 from engagement with the bottom 26 of the rear wall 12 thereby allowing the now loosely fitting vibrator bracket assembly 50 to be easily lifted out of the cavity of the female bracket by the handle 86.

Referring now to FIGS. 12 and 13, the third embodiment 110 of the present invention is used when the bottom edge of the rear plate member 36, the right hand tapered guide 32 and the left hand tapered guide 34 are out of alignment as may be also seen in FIGS. 4 and 5 and in the discussion above in connection with female bracket 30. When the rear plate member 36 extends below the bottom edge of the right hand tapered guide 32 and the left hand tapered guide 34 as seen in FIG. 5, the keeper member 76 of the first embodiment 50 may not be able to be used. The tongue portion 66 may need to be at least 2 inched longer than a standard length tongue. First of all, a space restriction such as a bend in the railroad car sidewall above the entry end of the female bracket, as depicted in FIG. 2, may not permit a tongue portion 66 that is as much as 2 inches longer than standard to be inserted into the female bracket 30. After the vibrator and the vibrator bracket 110 are loosely seated in the female bracket 30, the keeper member 112 in the form of an elongated pin is positioned in a through aperture 114 in the neck or web portion 60 of the vibrator. As previously mentioned this neck or web portion 60 may be integrally formed into a vibrator housing or provided as a separate T-shaped spacer 104 that is inserted between the mounting surface of the vibrator housing and the second side 73 of vibrator mounting member 52. The T-shaped spacer 60 may be seen in FIG. 14. After the body of the urging member 80 has be moved in contact with the wall of the railroad car and the vibrator 58 energized the vibrator bracket 110 may move upward until the keeper member 112 abuts surfaces at the bottom 26 of the female bracket for retaining the vibrator bracket in the female bracket during the operation of the vibrator 58. After the vibrator 58 is de-energized and the railroad car has been emptied, the pressure to the body of the urging member 80 is vented so that the operator is able to remove the keeper member 112 from the through aperture 114 thereby allowing the loosely fitting vibrator bracket assembly 50 to be easily lifted out of the cavity of the female bracket by the handle 86.

Referring now to FIGS. 2, 8 and 9, the use and operation of the second embodiment 90 of the vibrator bracket of the present invention is similar to the use and operation of the first embodiment 50 and third embodiment 110 of the present invention. This second embodiment 90 may be used with either of the known female brackets 10 or 30. This second embodiment 90 of the present invention may also be used when the entry end of the female bracket is mounted close to a bend 22 in the wall of the railroad car, as may be seen in FIG. 2. In this situation, the U-shaped upper portion 94 of the vibrator bracket 92 is separated from the middle portion 96 by removing the retaining members 98 prior to the installation of the vibrator mounting member 92 into the female bracket. The operator inserts the vibrator, vibrator mounting member and flange sub-assembly into the female bracket so that its flange is resting on the entry end 20 and the tongue portion 66 is loosely fitting therein. Subsequently the U-shaped upper portion 94 is positioned on the middle portion 96 so that the through apertures 102 are aligned and secured thereto by inserting the retaining member 98 into the through apertures 102. One or both of the keeper members 76 or 102 may be used when the urging member 80 is brought in contact with the wall of the railroad car and the vibrator is energized. The second embodiment 90 may be installed or removed either as a unit or as separated sub-assemblies to suit the mounting location of the female bracket on the wall of the railroad car.

It is to be noted, that in all the embodiments described above it is preferred that the vibrator 58 include a grasping handle also shown in dashed outline for aiding in the installation and removal of the present invention from the female bracket.

It is anticipated that the urging member may be brought in contact with the sidewall of the railroad car by means of either a mechanically operated device such as a toggle or an electrically operated device.

Directional terms such as "front", "back", "in", "out", downward, upper, lower and the like may have been used in the description. These terms are applicable to the embodiments shown and described in conjunction with the drawings. These terms are merely used for the purpose of description in connection with the drawings and do not necessarily apply to the position in which the present invention may be used.

While these particular embodiments of the present invention have been shown and described, it is to be understood that the invention is not limited thereto and protection is sought to the broadest extent that the prior art allows.

What is claimed is:

1. An actionable vibrator bracket for coupling a vibrator to a female receptacle attached to a railroad car that is to be vibrated, the female receptacle having an entry end and a second end that is distal to the entry end, said actionable vibrator bracket including:

a) a vibrator mounting member, a middle portion and an upper portion, the vibrator mounting member being adapted for mounting the vibrator thereto, the vibrator mounting member including at least one keeper member, the vibrator mounting member further including a tongue portion, the tongue portion being wedge shaped and having an insertion end, a first side, and a second side; the insertion end of the tongue portion projecting a predetermined distance from the middle portion, the middle portion further including at least one flange member, the flange member being arrayed for resting on the entry end of the female receptacle attached to the railroad car while allowing the insertion end of the tongue portion to project a selected distance beyond the second end of the female bracket, the upper portion extending a selected distance from the middle portion in a direction that is distal to the tongue portion and being configured for mounting an urging member thereon and thereto, the urging member being adapted for selective movement to and towards a wall of the railroad car;

b) wherein the tongue portion of the vibrator mounting member is sized to be loosely seated interior of the female receptacle while being simultaneously supported on the entry end of the female receptacle by the at least one flange of the middle portion, subsequent selective movement of the urging member to and towards the wall of the railroad car provides for the contact of the first side of the tongue portion with an adjacent rear wall of the female receptacle while simultaneously providing for the abutment of at least one keeper member with the second end of the female bracket for the selective emptying of the railroad car while retaining the vibrator mounting member therein, and selective movement of the urging member away from the wall of the railroad car allows for the removal of the abutment of the at least one keeper member from the second end of the female bracket for the loosening and subsequent easy removal of the vibrator mounting member from the female receptacle.

2. An actionable vibrator bracket as recited in claim 1 wherein the vibrator is a rotary vibrator and a body portion of the urging member is a pneumatic spring, the movement of the urging member to and towards the railroad car is caused by pressurizing the pneumatic spring to a predetermined pressure and selective movement of the urging member away from the railroad car is caused by depressurizing the pneumatic spring.

3. An actionable vibrator bracket as recited in claim 1 wherein the vibrator is a pneumatic rotary vibrator and a body portion of the urging member is a pneumatic spring, the movement of the urging member to and towards the railroad car is caused by pressurizing the pneumatic spring to a predetermined pressure and selective movement of the urging member away from the railroad car is caused by depressurizing the pneumatic spring.

4. An actionable vibrator bracket as recited in claim 2 wherein a first of the keeper members is a lug member that projects a selected distance from the first side of the tongue member.

5. An actionable vibrator bracket as recited in claim 3 wherein a first of the keeper members is a lug member that projects a selected distance from the first side of the tongue member.

6. An actionable vibrator bracket as recited in claim 2 wherein the keeper member is an elongated pin that is attached to the vibrator bracket by and with a flexible tether member and the elongated pin is sized for insertion into a first aperture that is located below the second end of the female bracket and the elongated pin abuts the second end of the female bracket after the urging member is moved to and towards the railroad car.

7. An actionable vibrator bracket as recited in claim 3 wherein the keeper member is an elongated pin that is attached to the vibrator bracket by and with a flexible tether member and the elongated pin is sized for insertion into a first aperture that is located below the second end of the female bracket and the elongated pin abuts the second end of the female bracket after the urging member is moved to and towards the railroad car.

8. An actionable vibrator bracket as recited in claim 4 wherein a second of the keeper members is an elongated pin that is attached to the vibrator bracket by and with a flexible tether member and the elongated pin is sized for insertion into a first aperture that is located below the second end of the female bracket and the elongated pin abuts the second end of the female bracket after the urging member is moved to and towards the railroad car.

9. An actionable vibrator bracket as recited in claim 5 wherein a second of the keeper members is an elongated pin that is attached to the vibrator bracket by and with a flexible tether member and the elongated pin is sized for insertion into a first aperture that is located below the second end of the female bracket and the elongated pin abuts the second end of the female bracket after the urging member is moved to and towards the railroad car.

10. An actionable vibrator bracket as recited in claim 1 wherein the vibrator mounting member and the upper portion are individual sub-assemblies that are removably joined at the middle portion by and with at least one retaining member that is selectively removable for selectively allowing the loosely seating and the easy removal of vibrator bracket as individual sub-assemblies when the female bracket is attached to the railroad car at a position that has limited access space adjacent the entry end.

11. An actionable vibrator bracket as recited in claim 2 wherein the vibrator mounting member and the upper portion are individual sub-assemblies that are removably joined at the middle portion by and with at least one retaining member that is selectively removable for selectively allowing the loosely seating and the easy removal of vibrator bracket as individual sub-assemblies when the female bracket is attached to the railroad car at a position that has limited access space adjacent the entry end.

12. An actionable vibrator bracket as recited in claim 3 wherein the vibrator mounting member and the upper portion are individual sub-assemblies that are removably joined at the middle portion by and with at least one retaining member that is selectively removable for selectively allowing the loosely seating and the easy removal of vibrator bracket as individual sub-assemblies when the female bracket is attached to the railroad car at a position that has limited access space adjacent the entry end.

13. An actionable vibrator bracket as recited in claim 4 wherein the vibrator mounting member and the upper portion are individual sub-assemblies that are removably joined at the middle portion by and with at least one retaining member that is selectively removable for selectively allowing the loosely seating and the easy removal of vibrator bracket as individual sub-assemblies when the female bracket is attached to the railroad car at a position that has limited access space adjacent the entry end.

14. An actionable vibrator bracket as recited in claim 5 wherein the vibrator mounting member and the upper portion are individual sub-assemblies that are removably joined at the middle portion by and with at least one retaining member that is selectively removable for selectively allowing the loosely seating and the easy removal of vibrator bracket as individual sub-assemblies when the female bracket is attached to the railroad car at a position that has limited access space adjacent the entry end.

15. An actionable vibrator bracket as recited in claim 6 wherein the vibrator mounting member and the upper portion are individual sub-assemblies that are removably joined at the middle portion by and with at least one retaining member that is selectively removable for selectively allowing the loosely seating and the easy removal of vibrator bracket as individual sub-assemblies when the female bracket is attached to the railroad car at a position that has limited access space adjacent the entry end.

16. An actionable vibrator bracket as recited in claim 7 wherein the vibrator mounting member and the upper portion are individual sub-assemblies that are removably joined at the middle portion by and with at least one retaining member that is selectively removable for selectively allowing the loosely seating and the easy removal of vibrator bracket as individual sub-assemblies when the female bracket is attached to the railroad car at a position that has limited access space adjacent the entry end.

\* \* \* \* \*